(12) United States Patent
Homer

(10) Patent No.: US 10,074,001 B2
(45) Date of Patent: Sep. 11, 2018

(54) DEVICE WITH FINGERPRINT SENSOR

(71) Applicant: NOVOMATIC AG, Gumpoldskirchen (AT)

(72) Inventor: Alois Homer, Vienna (AT)

(73) Assignee: NOVOMATIC AG, Gumpoldskirchen (AT)

( * ) Notice: Subject to any disclaimer, the term of this patent is extended or adjusted under 35 U.S.C. 154(b) by 0 days.

(21) Appl. No.: 15/305,947

(22) PCT Filed: Apr. 23, 2015

(86) PCT No.: PCT/EP2015/058783
§ 371 (c)(1),
(2) Date: Oct. 21, 2016

(87) PCT Pub. No.: WO2015/162203
PCT Pub. Date: Oct. 29, 2015

(65) Prior Publication Data
US 2017/0046553 A1   Feb. 16, 2017

(30) Foreign Application Priority Data

Apr. 23, 2014  (AT) .............................. A 50300/2014
May 30, 2014  (DE) ........................ 10 2014 008 160

(51) Int. Cl.
*G06K 9/00*       (2006.01)
*G07C 9/00*       (2006.01)
(Continued)

(52) U.S. Cl.
CPC .......... *G06K 9/00013* (2013.01); *A63F 13/73* (2014.09); *G01L 5/0038* (2013.01);
(Continued)

(58) Field of Classification Search
CPC ...................... G06K 9/00013; G06K 9/00006; A63F 13/73; G01L 5/0038; G07C 9/00158; G07F 17/3241
See application file for complete search history.

(56) References Cited

U.S. PATENT DOCUMENTS 4,467,545 A   8/1984  Shaw, Jr.
5,546,471 A   8/1996  Merjanian
(Continued)

FOREIGN PATENT DOCUMENTS

DE    19944140    3/2001
EP    0853795     7/1998
(Continued)

OTHER PUBLICATIONS

International Search Report for PCT/CN2014/058783, English Translation attached to original, Both completed by the European Patent Office dated Jul. 13, 2015, All together 5 Pages.

*Primary Examiner* — John Strege
(74) *Attorney, Agent, or Firm* — Brooks Kushman P.C.

(57) ABSTRACT

Devices with a fingerprint sensor paired with a handle or a hand support. The fingerprint sensor is arranged in the vicinity of the handle or the hand support surface at a distance from the handle or hand support surface such that when an index, and/or middle, and/or ring, and/or little finger of a hand grips the handle or an index, and/or middle, and/or ring, and/or little finger of a hand is placed on the support surface, the thumb the hand can be placed on the fingerprint sensor such that a longitudinal axis of the thumb substantially coincides with a main axis of the fingerprint sensor. The thumb is placed either next to the handle and thus on the fingerprint sensor or the fingerprint sensor is arranged on a housing side of the device.

15 Claims, 5 Drawing Sheets

Figure 1:
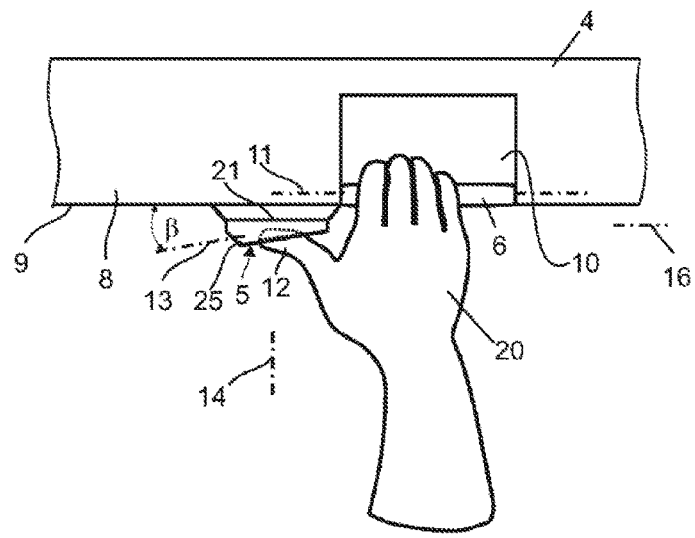

(51) Int. Cl.
*A63F 13/73* (2014.01)
*G01L 5/00* (2006.01)
*G07F 17/32* (2006.01)

(52) U.S. Cl.
CPC ..... *G06K 9/00006* (2013.01); *G07C 9/00158* (2013.01); *G07F 17/3241* (2013.01)

(56) References Cited

U.S. PATENT DOCUMENTS

| | | | |
|---|---|---|---|
| 5,729,334 A | | 3/1998 | Van Ruyven |
| 5,812,252 A | | 9/1998 | Bowker et al. |
| 5,937,557 A | | 8/1999 | Bowker et al. |
| 6,100,811 A | * | 8/2000 | Hsu ................... B60H 1/00642 340/426.36 |
| 6,175,641 B1 | | 1/2001 | Kallo et al. |
| 6,260,300 B1 | | 7/2001 | Klebes et al. |
| 6,307,956 B1 | | 10/2001 | Black |
| 6,374,652 B1 | * | 4/2002 | Hwang .............. G07C 9/00158 292/350 |
| 6,597,945 B2 | | 7/2003 | Marksteiner |
| 6,980,672 B2 | | 12/2005 | Saito et al. |
| 7,023,319 B2 | * | 4/2006 | Hwang ................... E05B 1/00 340/5.53 |
| 7,047,419 B2 | | 5/2006 | Black |
| 7,113,070 B2 | * | 9/2006 | Deng ................. E05B 47/0676 340/5.2 |
| 7,161,185 B2 | | 1/2007 | Yamazaki et al. |
| 7,539,329 B2 | * | 5/2009 | Sellers ................. G06F 1/1616 283/68 |
| 7,590,269 B2 | * | 9/2009 | Creasey ............. G06F 3/03547 340/5.53 |
| 7,961,914 B1 | | 6/2011 | Smith |
| 8,628,416 B2 | | 1/2014 | Scott et al. |
| 9,867,513 B1 | | 1/2018 | Hall et al. |
| 2002/0034321 A1 | | 3/2002 | Saito et al. |
| 2004/0164845 A1 | * | 8/2004 | Hwang ..................... E05B 1/00 340/5.53 |
| 2006/0055509 A1 | * | 3/2006 | Teshima ................ B60R 25/252 340/5.53 |
| 2007/0137267 A1 | * | 6/2007 | Pilatowicz ............ E05B 47/068 70/107 |
| 2008/0249869 A1 | | 10/2008 | Angell et al. |
| 2010/0109838 A1 | * | 5/2010 | Fisher ................ G07C 9/00158 340/5.72 |
| 2010/0156594 A1 | | 6/2010 | Chaikin et al. |
| 2010/0246902 A1 | | 9/2010 | Rowe et al. |
| 2011/0057775 A1 | * | 3/2011 | Joung ................ G06K 9/00013 340/5.82 |
| 2014/0028439 A1 | * | 1/2014 | Lien ................... G06K 9/00087 340/5.53 |
| 2014/0196636 A1 | * | 7/2014 | Deweese ................... E05G 1/00 109/23 |
| 2014/0338409 A1 | * | 11/2014 | Kraus ..................... E05B 81/76 70/278.1 |
| 2015/0337571 A1 | * | 11/2015 | Henderson ............. E05B 85/16 701/49 |
| 2016/0321493 A1 | | 11/2016 | Pope et al. |
| 2017/0046553 A1 | | 2/2017 | Homer |
| 2017/0246332 A1 | * | 8/2017 | Marshall ................... A61L 2/24 |

FOREIGN PATENT DOCUMENTS

| | | |
|---|---|---|
| EP | 0976897 | 2/2000 |
| EP | 1094750 | 5/2001 |
| WO | 2010051041 | 5/2010 |
| WO | 2011041619 | 4/2011 |

* cited by examiner

DEVICE WITH FINGERPRINT SENSOR

CROSS-REFERENCE TO RELATED APPLICATION

This application is the U.S. national phase of PCT Application No. PCT/EP2015/058783 filed on Apr. 23, 2015, which claims priority to AT Patent Application No. A50300/2014 filed on Apr. 23, 2014, and DE Patent Application No. 10 2014 008 160.5 filed May 30, 2014, the disclosures of which are incorporated in their entirety by reference herein.

TECHNICAL FIELD

In general, the present invention relates to devices which comprise a fingerprint sensor. In particular, the present invention relates to devices, in which the fingerprint sensor is assigned to a handle or a hand bearing area.

PRIOR ART

Such devices with a fingerprint sensor can find use, in particular, in gaming and/or entertainment and/or gambling machines, as are used in casinos or amusement arcades, or else in devices actuated by money or monetary value items such as vending machines, where, for example, wares or else gaming chips may be purchased, or else entry control systems such as e.g. turnstiles or entry barrier systems.

Here, in general, the fingerprint sensor serves to identify the user of the respective device, wherein the biometric data, for example of the thumb or of a fingertip, detected by way of the fingerprint sensor may be used in various ways. By way of example, a release apparatus connectable to the fingerprint sensor may, depending on the detected fingerprint, release a device function, for example lift a device block or release an entry barrier, if the detected fingerprint corresponds, or comes sufficiently close, to a stored fingerprint or, conversely, deviates sufficiently from a stored fingerprint; i.e., a check can be carried out with the aid of the fingerprint as to whether an authorized or a barred person attempts to actuate the device.

As an alternative or in addition to such a release function, the fingerprint sensor may also be connected to a device adjustment apparatus, by means of which personal device settings, such as e.g. screen position, character and/or letter size or other image display options or else, for example, a games preselection may be preconfigured in a user-individual manner on the basis of the detected fingerprint.

Alternatively, or additionally, the fingerprint sensor may also be connected to a user detection unit which, depending on the respectively detected fingerprint, ascribes user data to an individual user account—such as e.g. storing usage times or obtained winnings in a user account or debiting gaming stakes from a user account, depending on the respective fingerprint.

However, in previous devices of this type, the handling and usability of the fingerprint sensor are sometimes unwieldy for the user and more likely to be an impairment for the operation of other device elements since the finger or thumb to be positioned on the fingerprint sensors binds the remaining fingers of the hand in a specific position.

Document DE 199 44 140 A1 has disclosed a money-operated device in the form of a gaming machine, in which a fingerprint sensor is integrated into the start switch of the device, by means of which a game may be started on the entertainment device. A miniaturized camera or a COD area sensor, which is provided in the contact faces of the aforementioned start switch, detects the fingerprint of the user pressing the start switch, with the detected fingerprint then being compared to previously stored fingerprints in order to check whether an authorized user is activating the entertainment device. Since the start switch is simultaneously pressed-in when the finger or thumb is placed onto the fingerprint sensor, the placement on the fingerprint sensor is however sometimes too forceful or the finger may slip such that it is not possible to detect the biometric data cleanly.

Furthermore, a door handle, in which a fingerprint sensor is integrated to release an electronic door lock in a manner dependent on the detected fingerprint, is known from document US 2014/0028439 A1. Here, the fingerprint sensor is provided on a front side of the handle, facing the user, in the region of the axis of rotation of the door handle. However, similar problems may occur here. The thumb to be placed onto the fingerprint sensor may slip when rotating the door handle such that it is not possible to detect the biometric data cleanly.

Furthermore, WO 2011/041619 A1 has disclosed a gaming machine which comprises a separate operating tablet which is connectable to a games computer system by means of a cable. Here, a magnetic strip card laser, which is intended to have a fingerprint sensor assigned thereto in order to increase the security, should be provided on the operating tablet.

SUMMARY OF THE INVENTION

The present invention is therefore based on the object of developing an improved device of the type set forth at the outset, which avoids the disadvantages of the prior art and advantageously develops the latter. In particular, the handling and usability of the fingerprint sensor on the device should be simplified.

According to the invention, the object is achieved by a device in accordance with the independent claim. Preferred configurations of the invention are the subject matter of the dependent claims.

Thus, in the case of a device with a handle, it is proposed to provide the fingerprint sensor not immediately on the handle but rather next to the handle within the thumb reach range in such a way that a thumb extending away from the handle comes to rest on the fingerprint sensor with its thumb tip. If a hand of the user grasps the handle with index finger, middle finger, ring finger and/or little finger, the thumb comes to rest, virtually by itself (on account of the hand geometry), on the fingerprint sensor in the case of a natural thumb position, in which the thumb extends away from the grasped handle. According to the invention, the fingerprint sensor is arranged spaced apart from the handle in the vicinity of the handle in such a way that, when the handle is grasped by index finger and/or middle finger and/or ring finger and/or little finger of one hand, the thumb of this hand is able to be placed next to the handle on the fingerprint sensor. A thumb tip longitudinal axis of the thumb substantially coincides with a principal axis of the fingerprint sensor in this case.

Here, the fingerprint sensor may be arranged directly on a device housing which adjoins the handle or extends in the surroundings of the handle, wherein the device housing may, for example, enclose a body part of the device surrounding the handle and/or may form a fastening base for the handle. Here, the fingerprint sensor can be placed onto the device housing. Alternatively, the fingerprint sensor may however also be recessed into the device housing or else sunk in the housing. That is to say, the fingerprint sensor is arranged set back or recessed with respect to, the surrounding device surface. However, as an alternative to arranging the fingerprint sensor on or in the device housing, the fingerprint sensor may also be provided on a device part that is separate from the device housing—such as e.g. a sensor carrier arm protruding beyond the device housing or an e.g. pedestal-shaped sensor support, which projects from the actual device housing.

In order to obtain a virtually automatic intuitive placement of the thumb onto the fingerprint sensor in the case of a natural thumb position, the fingerprint sensor may, in particular, be arranged offset from the handle transversely to the handle longitudinal axis. If the handle has a horizontal alignment in a development of the invention, the fingerprint sensor may advantageously be arranged below the handle. If the handle is, alternatively, aligned upright, the fingerprint sensor may be arranged to the left of the handle for a right-handed grip and to the right of the handle for a left-handed grip, wherein, in this case, such a fingerprint sensor may also be provided on both sides of the handle for a two-sided grip.

In order to be able to use the fingerprint sensor equally for the left hand and the right hand with a fitting arrangement, the handle may have an embodiment with a changeable position in a development of the invention, in particular in such a way that the handle is able to be brought into at least two different work positions relative to the fingerprint sensor. Here, one of these work positions in relation to the fingerprint sensor is such that the right thumb is able to be placed onto the fingerprint sensor. Here, the other work position is such that the left thumb is able to be placed onto the fingerprint sensor. Advantageously, the handle is able to be fixed in the respective work position such that a hand is able to be supported in a stable manner.

Here, the handle can be embodied or mounted in e.g. a re-connectable manner such that it can be brought into two different positions by reconnection. Alternatively, or additionally, the handle may also be mounted in a swiveable manner such that it is swiveable to-and-fro between the two aforementioned work positions. Alternatively, or additionally, the handle may also be mounted in a displaceable manner, for example along the longitudinal axis thereof such that, sometimes, it comes to rest predominantly to the left of the fingerprint sensor and, at other times, it comes to rest predominantly to the right of the fingerprint sensor and it is accordingly selectively positioned with the left hand or the right hand fitting to the fingerprint sensor.

If the handle has an embodiment with a changeable position, provision can advantageously also be made of a parked position or non-work position of the handle, in addition to the at least one work position in which the thumb is able to be placed onto the fingerprint sensor, the handle e.g. being sunk into a device body or being directly set aside in a non-interfering position in said parked or non-work position.

As an alternative or in addition to the aforementioned transverse offset of the fingerprint sensor, the fingerprint sensor may also be arranged spaced apart from the handle or a grip portion of the handle in the longitudinal direction of the handle, said grip portion being provided for the balls of the hands or the index finger and/or middle finger and/or ring finger and/or little finger, in particular displaced slightly beyond the end of the handle or the grip portion at which the index finger grips during intended use such that the thumb, which obliquely projects beyond the end of the handle from the ball of the hand, comes to rest on the fingerprint sensor with the tip of the thumb or the last thumb phalange when the hand grasps the aforementioned handle with the fingers.

The distance of the fingerprint sensor from the handle or the grip portion thereof is advantageously restricted to the conventional thumb reach of a hand of average size and may be a few centimeters across the handle longitudinal axis and/or in the direction of the handle longitudinal axis.

In order to avoid an unnatural spread of the thumb when the thumb is placed onto the fingerprint sensor when grasping the handle with the remaining figures, the fingerprint sensor may, in a development of the invention, be arranged with a principal axis tilted in relation to the longitudinal axis of the handle, in particular arranged with an acute-angled inclination. The aforementioned principal axis of the fingerprint sensor may in this case be a longitudinal central axis of the bearing face of the fingerprint sensor and/or a principal axis of the image sensor system of the fingerprint sensor, in which the evaluation device of the fingerprint sensor expects a principal axis of the print image, in particular the thumb tip longitudinal axis.

Here, the fingerprint sensor may be arranged with a tilt or an acute-angled inclination about one axis, or else about multiple axes, in relation to the longitudinal axis of the handle, wherein the aforementioned principal axis of the fingerprint sensor may also have a skew arrangement in relation to the handle.

Here, the principal axis of the fingerprint sensor may have an acute-angled tilt in relation to the handle longitudinal axis about a tilt axis, which is aligned substantially perpendicular to the bearing face of the fingerprint sensor and/or perpendicular to the device housing surrounding the fingerprint sensor. Alternatively, or additionally, the aforementioned principal axis of the fingerprint sensor may also be tilted in relation to the handle longitudinal axis about a tilt axis which extends at least approximately parallel to the bearing surface of the fingerprint sensor and/or parallel to the device housing surrounding the fingerprint sensor.

The inclination or tilt of the aforementioned principal axis in relation to the handle longitudinal axis may, in this case, have different dimensions as a matter of principle, wherein the inclination in relation to the handle longitudinal axis in respect of the aforementioned axes may lie in the range from 5 degrees to 35 degrees in order to achieve an ergonomically natural rest of the thumb on the fingerprint sensor. However, other inclinations may also be advantageous depending on the contour of the handle—which may e.g. be slightly arcuate.

In one development of the invention, the fingerprint sensor may have an uprightly aligned bearing surface for the thumb. In particular, the fingerprint sensor may have a bearing surface which lies in a plane or which nestles to a plane which may be arranged with an acute-angled inclination in relation to the handle longitudinal axis, for example inclined at an angle of 10-30 degrees. The aforementioned plane and the handle may in this case define a wedge converging approximately in the region of the ball of the hand, i.e. the bearing surface spreads further away from the handle with increasing distance therefrom.

In an advantageous development of the invention, the fingerprint sensor may be arranged on a front side of the device which faces the user of the device and is at least approximately upright such that the fingerprint sensor faces a user standing in front of the device and a thumb tip facing away from the body of the user is able to be placed onto the fingerprint sensor.

Occasionally, a bearing surface for the fingers of an open hand, i.e. index finger, middle finger, ring finger and/or little finger, is provided on gaming machines or other devices of the type set forth at the outset as an alternative or in addition to the aforementioned handles such that the user of the device is able to place the open hand onto the aforementioned bearing surface. Operating buttons may be provided on this bearing surface—such as e.g. a pressure switch or a rocker switch, by means of which device functions are controllable. Such a bearing surface may be provided on a horizontal housing portion such as e.g. a horizontally aligned keyboard portion. Alternatively, such a bearing surface for the stretched-out fingers of a hand may also be arranged on an upright side surface, for example in order to be able to actuate the flippers on a pinball machine, on which the actuation buttons for the flippers are attached laterally to the right and to the left.

In accordance with a further aspect of the present invention, the fingerprint sensor may be arranged on a device housing side, which has an acute-angled or obtuse-angled inclination in relation to a device housing side on which a bearing surface for the index finger and/or middle finger and/or ring finger and/or little finger is provided, such that, when index finger and/or middle finger and/or ring finger and/or little finger is placed onto the bearing surface of the one device housing side, the thumb is able to be placed on the fingerprint sensor on the other device housing side. The fingerprint sensor and the bearing surface for index finger and/or middle finger and/or ring finger and/or little finger are separated from one another by a housing edge, which optionally may also have a rounded-off embodiment, and arranged on housing sides that are aligned to different sides. While the extended fingers of one hand rest on the one device housing side, the thumb may, so to speak in a natural position, grip around a housing corner and, so to speak, rest on the fingerprint sensor around the housing edge.

In particular, the two housing sides, on which, on the one hand, the aforementioned bearing surface and, on the other hand, the fingerprint sensor are arranged, may be aligned at least approximately at right angles in relation to one another.

Here, the fingerprint sensor may be arranged on an upright housing side in an advantageous development of the invention.

The other housing side, on which the bearing surface for the remaining fingers of the hand is provided, may have a horizontal alignment, but may otherwise also extend upright. Here, the aforementioned bearing surface may have a smooth and planar contour, or else a slight relief-like contour in the style of a fingerprint bed to promote intuitive placement of the stretched-out fingers at the right position. Here, an actuation button or an actuation element for entering control commands or other items of information into the device may be attached to the aforementioned bearing surface for the index finger and/or middle finger and/or ring finger and/or little finger such that the hand placed on the bearing surface may simultaneously actuate the actuation element while the thumb reaching around the edge is scanned by the fingerprint sensor.

Here, with a principal axis—which may, as explained above, be a central longitudinal axis of the bearing surface of the fingerprint sensor or, as explained above, be an expected principal axis of the print image—, the fingerprint sensor may have an alignment with an acute-angled inclination in relation to the longitudinal direction of the housing edge connecting, or separating, the two housing sides, wherein the acute-angled inclination of the principal axis of the fingerprint sensor may have a tilt about one axis or two axes in relation to the aforementioned device edge, wherein the tilt may be constituted in a manner analogous to the above-described tilt in relation to the handle longitudinal axis such that reference may be made to the description above in order to avoid repetition.

Here, in an advantageous development of the invention, the fingerprint sensor is not fixedly arranged or aligned in a fixed position relative to the handle or relative to the finger bearing surface but instead arranged in a moveable manner or mounted in a moveable manner so as to be able to be brought into individually fitting positions—i.e. for the respective user and his hand.

In particular, the fingerprint sensor may be mounted rotatable or tiltable about at least one axis of rotation, wherein, in an advantageous development of the invention, a filtability about a tilt axis aligned at least approximately perpendicular to the bearing surface of the fingerprint sensor and/or about a tilt axis arranged at least approximately parallel to a plane in which the bearing surface of the fingerprint sensor lies or to which the bearing surface nestles may be provided. By way of example, in the case of an arrangement on an upright housing side, the fingerprint sensor may be tiltable about an upright tilt axis and/or tiltable or rotatable about a horizontal tilt axis which extends parallel to the upright housing side on which the fingerprint sensor is arranged. As an alternative or in addition to the aforementioned upright and horizontal tilt axes, the fingerprint sensor may also be tiltable or rotatable about a horizontal tilt axis extending substantially perpendicular to the housing side on which the fingerprint sensor is arranged.

As an alternative or in addition to such a tiltability or rotatability, the fingerprint sensor may also be mounted in a translationally displaceable manner, in particular in a plane approximately parallel to the housing side on which the fingerprint sensor is provided. By way of example, the fingerprint sensor may be displaceable upward or downward and/or to the right and left on an upright device housing front side in order to be in an ideal position relative to the handle or the above-described bearing surface for the fingers. If the fingerprint sensor is arranged on a horizontally aligned device housing side, the fingerprint sensor may be displaceable to the right and to the left and/or forward and backward.

The fingerprint sensor and the aforementioned handle or the aforementioned finger bearing surface may be arranged directly on the device housing of the gaming machine or of the main device. However, in an alternative development of the invention, the device having the fingerprint sensor and the handle or the finger bearing surface may also be embodied as a separate input device which has an interface for connection to the main device, for example in the form of a gaming machine or PC. By way of example, the aforementioned interface may comprise a serial interface, for example embodied in the form of a USB interface or a LAN or WLAN interface.

IMPLEMENTATION OF THE INVENTION

Figure 2:
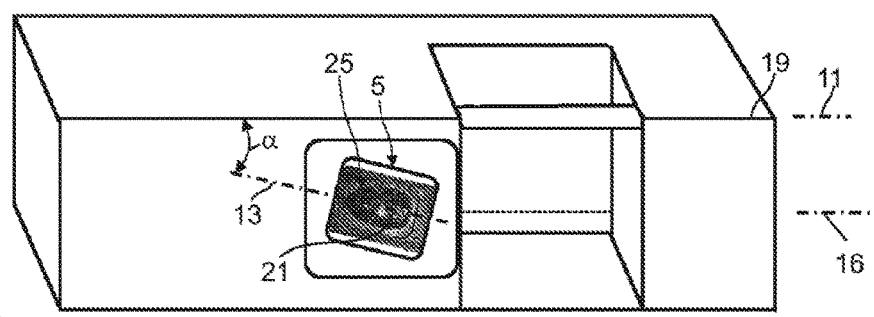
Figure 3:
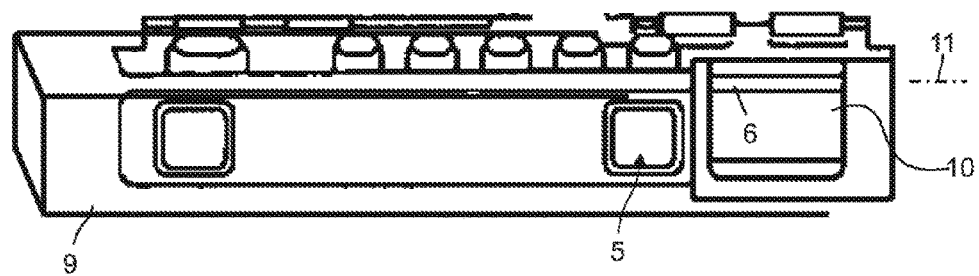
Figure 4:
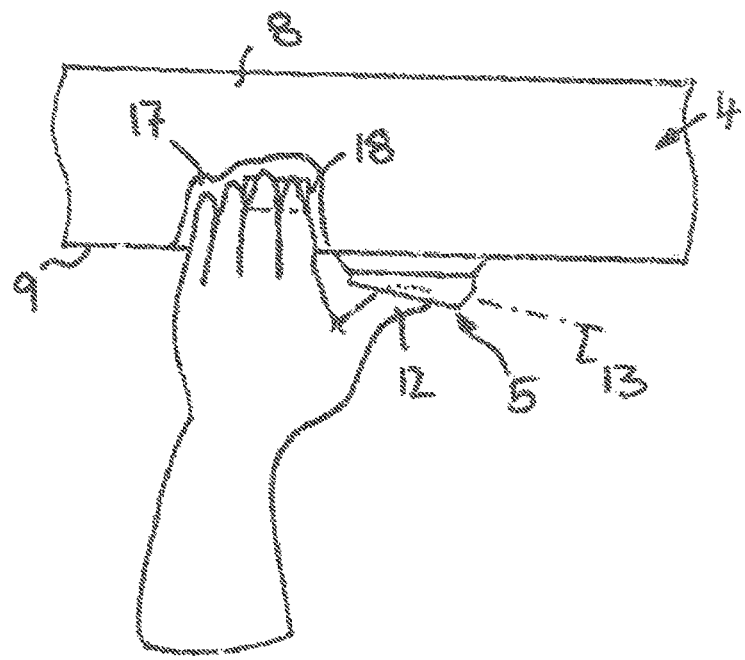
Figure 5:
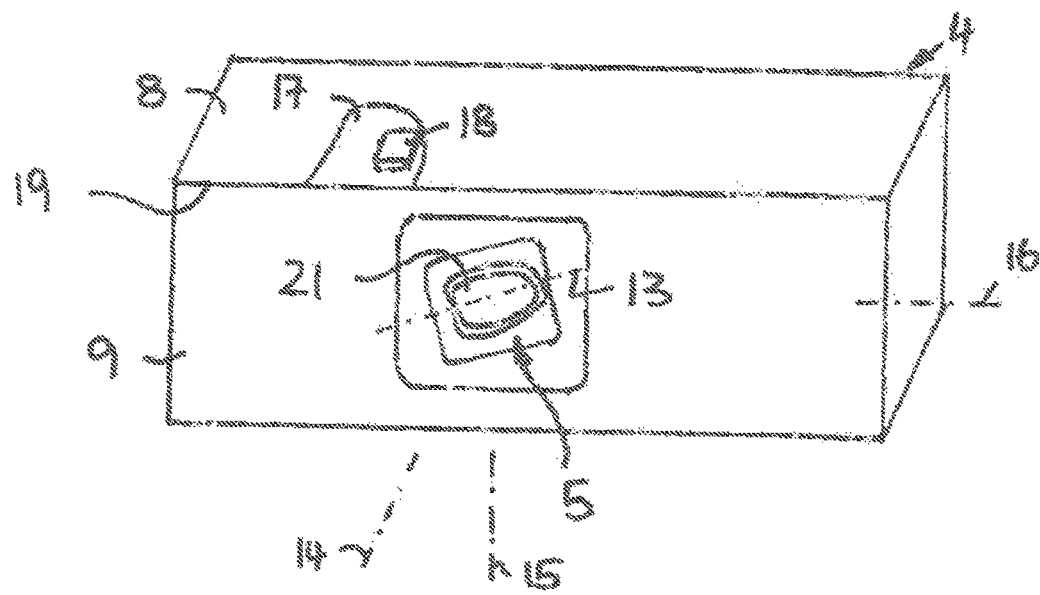
Figure 6:
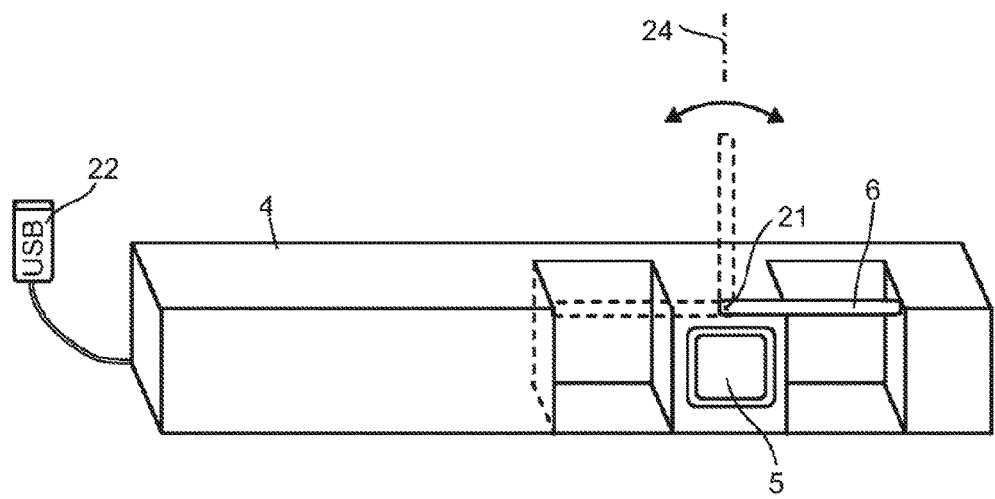
Figure 7:
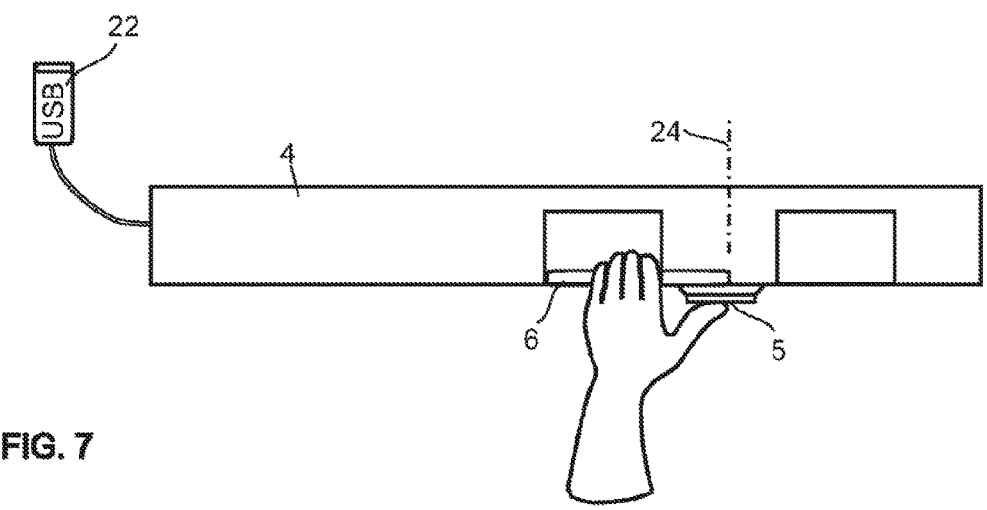
Figure 8:
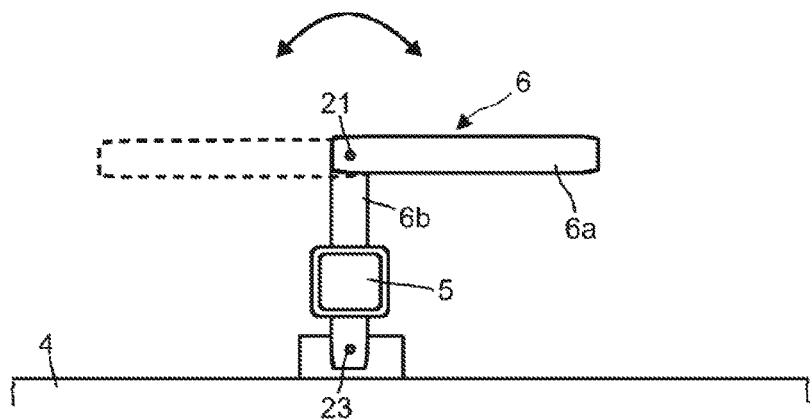
Figure 9:
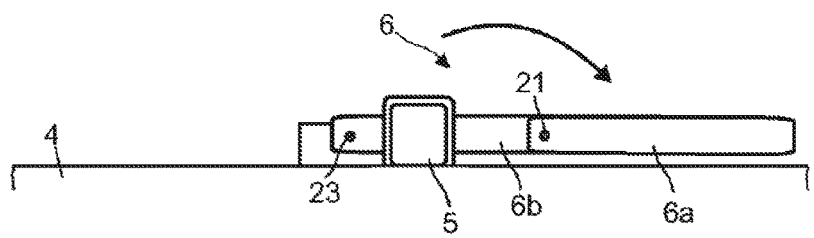
Figure 10:
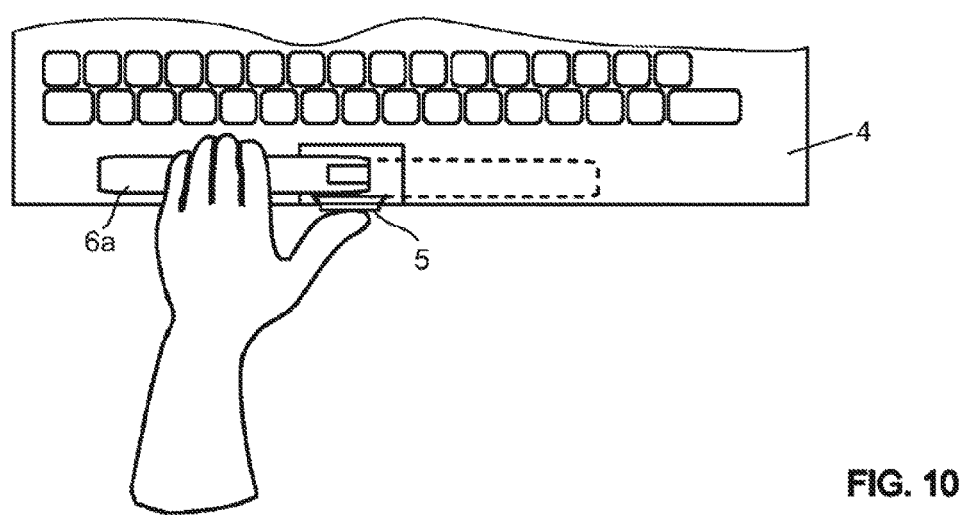
Figure 11:
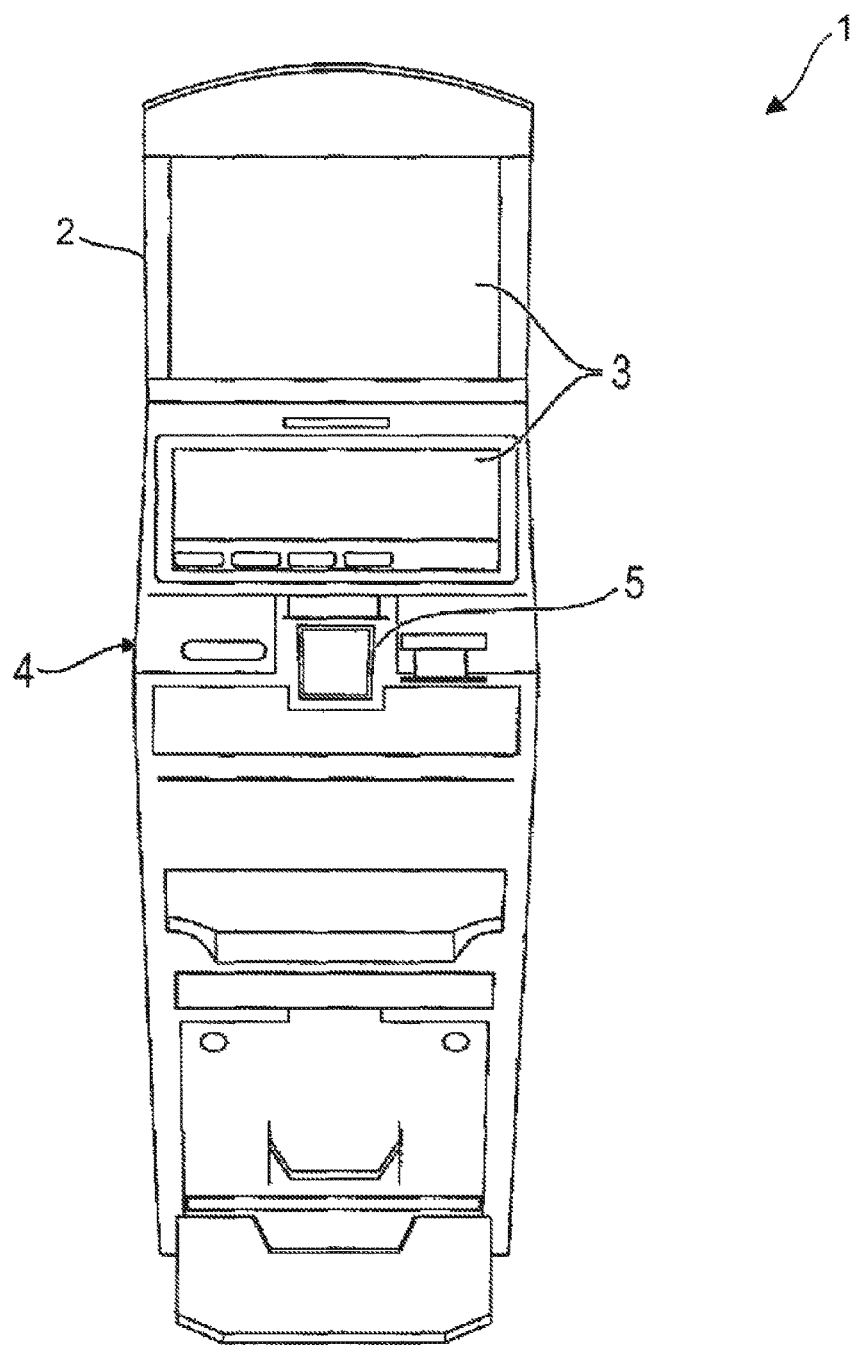

The invention is explained in more detail below on the basis of preferred exemplary embodiments and associated drawings. In the drawings:

FIG. 1: shows a schematic top view of a device housing portion with a handle which is gripped by the fingers of a hand, wherein the fingerprint sensor arranged on an upright device housing front side is contacted by a thumb tip, FIG. 2: shows a perspective front view of the device housing portion from FIG. 1, which shows the arrangement of the fingerprint sensor on the device housing front side and the positioning thereof relative to the handle, FIG. 3: shows a perspective illustration of the device housing portion with the handle from the preceding figures, FIG. 4: shows a top view of the top side of a device housing portion similar to FIG. 1, wherein a bearing region, for the stretched-out fingers of a hand, with an operating button arranged therein is provided on the housing top side and a hand placed thereon with the thumb gripping around the device housing edge is positioned on a fingerprint sensor which is provided on the upright front side, FIG. 5: shows a perspective front view of the device housing portion from FIG. 4, which shows the bearing region with the operating button for the stretched-out fingers of the hand on the top side and the arrangement of the fingerprint sensor on the upright front side, FIG. 6: shows a perspective front view of the device housing portion from FIG. 1, wherein, in accordance with a further advantageous embodiment of the invention, a handle, the position of which is able to be changed, is able to be brought into various positions relative to a fingerprint sensor in order, selectively, to be able to place down the left-hand or the right hand and be able to position the corresponding thumb on the fingerprint sensor, FIG. 7: shows a schematic top view of the top side of the device housing portion from FIG. 6, when the handle is swiveled into the position for left-handed operation, FIG. 8: shows a front view of the device housing portion from FIG. 1, wherein, in accordance with a further embodiment of the invention, a two-member swivelable handle is provided, which is able to be moved between two work positions for right-handed use and left-handed use and a parked position, and which carries the fingerprint sensor on the moveable support strut thereof, wherein, in accordance with FIG. 8, the handle is shown in a work position for the right hand and, in a dashed illustration, the work position for the left hand, FIG. 9: shows a front view of the device housing portion similar to FIG. 8, wherein the handle is shown in its parked position or non-operational position, FIG. 10: shows a top view of the device housing portion from the two preceding figures, wherein the handle is shown in its work position for the left hand, and FIG. 11: shows an overview of a device in the form of a gaming and/or entertainment machine, which comprises screens and a horizontally aligned operating panel with input means, wherein an embodiment according to the prior art is depicted, in which a fingerprint sensor is provided centrally on a top side of the operating panel.

As FIG. 11 shows—even though this shows a fingerprint sensor arrangement according to the prior art—a device implementing the invention may be embodied e.g. as a gaming and/or entertainment device, as is used in casinos or amusement arcades, wherein the device may, for example, be embodied as a standalone device. The device 1 may comprise a device housing 2 which—loosely speaking— may have an approximately cubic shape, but else a sculpture-like design. One or more screens 3 may be arranged on the aforementioned device housing 2, but provision may also be made of different indication means, such as e.g. rotating reels.

A device housing portion 4, which advantageously may have a horizontal alignment and, for example, be formed in a panel-like manner, may act as operating portion, wherein input means, for example in the form of operating buttons or touchscreen elements, may be provided at the aforementioned device housing portion 4.

While a fingerprint sensor 5 was arranged centrally on a top side of the aforementioned device housing portion 4 with a slight inclination in devices from the prior art, as shown in FIG. 11, the fingerprint sensor 5 in accordance with the exemplary embodiments of the invention, shown in FIGS. 1 to 5, is arranged in a special manner relative to a handle or a hand bearing surface.

As shown in FIGS. 1 to 3, the aforementioned device housing portion 4 which, when viewed overall, may have a horizontal alignment, may comprise a handle 6 that may be arranged horizontally on a front side of the device housing portion 4. In particular, the aforementioned handle 6—loosely speaking—may have a rod-shaped embodiment and/or be arranged on a housing edge 19 which connects a horizontal top side 8 and an upright front side 9 of the device housing portion 4. Here, the device housing portion 4 may comprise a recess 10 around the handle 6 such that a hand 20 can grasp the handle 6 with index finger, middle finger, ring finger, and little finger. The necessary clearance for grasping the handle 6 may however also be obtained by e.g. an arcuate or protruding contour of the handle 6, and so the aforementioned recess 10 is not mandatory.

As shown in FIGS. 1 and 2, a fingerprint sensor 5 may be assigned to the handle 6, said fingerprint sensor being arranged at a distance from an end of the handle 6 both transversely to the longitudinal axis 11 of the handle 6 and in the direction of the aforementioned longitudinal axis 11. In particular, the aforementioned fingerprint sensor 5 may be arranged on the upright front side 9 of the device housing portion 4, wherein the fingerprint sensor 5 may be arranged slightly below the handle 6 and away from the handle 6 to one side—to the left in accordance with FIG. 2—such that a thumb 12 which is not grasping the handle 6 but instead spread away from the handle 6 comes to rest on the aforementioned fingerprint sensor 5 in the case of a natural, intuitive thumb position.

The distance of the fingerprint sensor 5 from the aforementioned handle 6 transversely to the handle longitudinal axis 11 and/or in the direction of the handle longitudinal axis 11 from the handle end (downward and to the left in respect of the handle 6 in accordance with FIG. 2) advantageously equals the distance of the thumb tip from the root joint of the index finger, i.e. the usual thumb reach range when the thumb is spread away, and may be a few centimeters.

As shown in FIG. 2, the fingerprint sensor 5, with a principal axis 13, may be arranged tilted in an acute-angled manner about an angle α in relation to the handle longitudinal axis 11, wherein the aforementioned angle α may be e.g. 5 to 35 degrees, in particular dimensioned in such a way that the principal axis 13 corresponds to the thumb longitudinal axis in the case of a natural thumb position. Advantageously, the fingerprint sensor 5 may have a thumb guide 25 for simple positioning of the thumb on the fingerprint sensor 5. By way of example, lateral walls or elevations may be present, which extend parallel to the principal axis 13 and thus guide the thumb laterally (to the left and right) such that an ideal orientation of the thumb is provided in relation to a bearing surface 21 of the fingerprint sensor 5. Additionally, or optionally, a front guiding wall may be present, said front guiding wall being arranged transversely to the principal axis 13 and forming a stop for the thumb, i.e. said stop preventing further guidance of the thumb into the fingerprint sensor 5 in the direction of the principal axis 13. As shown in FIG. 1, the thumb guide 25 has an integral embodiment as a thumb groove; in this respect, the thumb is guided laterally (to the left and right) and, at the same time, the thumb, i.e. the thumb tip, is also restricted to the front.

As an alternative or in addition to the twist of the fingerprint sensor 5 in the plane of the front side 9—i.e.

about an axis perpendicular to the front side 9—visible in FIG. 2, the fingerprint sensor 5 may be tilted out of the front side 9 with the bearing surface 21 or the principal axis 13 thereof. This tilt in respect of an upright tilt axis 15 parallel to a front side is shown by the acute angle β, visible in FIG. 1, in relation to the handle longitudinal axis 11. This tilt may likewise lie in the range from approximately two (2) to 35 degrees.

Alternatively, or additionally, the fingerprint sensor 5, with the bearing surface thereof, may also be tilted about a horizontal tilt axis 16 in relation to the device housing front side 9 or the handle longitudinal axis 11.

In an advantageous development of the invention, the fingerprint sensor 5 is not rigidly fastened in terms of the alignment thereof in respect of the handle 6, but instead mounted in a rotatable or tiltable manner. A rotatability or tiltability may in this case be provided in respect of one, some or all of the aforementioned tilt axes 14, 15 and 16, wherein the tiltability may be dimensioned in such a way that the fingerprint sensor 5 is able to be brought into various rotational or tilt positions, in which it then keeps its position independently or in a self-locking manner, or else in which it can be affixed by fixation means. Alternatively, or additionally, a restoration into a neutral initial position, for example by means of spring means assigned to the tilt axes 14, 15 and 16, is also possible. It may be mentioned that the tiltability, in particular the rotatability, may be assisted by a thumb guide arranged on the fingerprint sensor 5.

As shown in FIGS. 4 and 5, the fingerprint sensor 5 may also be assigned a bearing surface 17, on which the index finger and/or middle finger and/or ring finger and/or little finger of the hand may be placed, wherein the aforementioned bearing surface 17 may, for example, be contoured in the form of a slight groove in order to intuitively guide the hand into the correct position. By way of example, the bearing surface 17 may also be assigned input means, for example in the form of an operating button 18, with the aid of which e.g. control commands for the device may be entered.

Here, the aforementioned bearing surface 17 is provided on a first device housing side which may form the horizontal top side 8 of the device housing portion 4. By contrast, the fingerprint sensor 5 is arranged on a second device housing side, which may be inclined in relation to the aforementioned first device housing side, in particular arranged approximately perpendicular thereto. In particular, the fingerprint sensor 5 may be provided on an upright front side 9 of the device housing portion 4.

Here, the fingerprint sensor 5 is spaced apart from the bearing surface 17 for the fingers transversely to the housing edge 19, which connects the two aforementioned device housing sides, and/or spaced apart from the bearing surface 17 in the longitudinal direction of the aforementioned housing edge 19, in particular in such a way that the thumb 12 of a hand, the index finger to little finger of which rest on the bearing surface 17 as intended, intuitively comes to rest on the fingerprint sensor 5 in a natural position, cf. FIG. 4.

Here, the fingerprint sensor 5 may advantageously be arranged in a rotatable or tiltable manner, as described for the embodiment in accordance with FIGS. 1 to 3. The corresponding tilt axes 14 to 15 are likewise plotted in FIGS. 4 and 5. Advantageously, the fingerprint sensor 5, with the principal axis 13 thereof, is correspondingly in an acute-angled inclined alignment in relation to the longitudinal axis of the device housing edge 19, as was explained above for the acute-angled inclination in relation to the handle longitudinal axis 11. To avoid repetition, reference is made to the description above.

As shown in FIGS. 6 and 7, the handle 6 may also have a changeable embodiment in terms of position, in particular in such a way that the handle 6 is able to be brought into two different work positions relative to the fingerprint sensor 5. Here, one work position may serve, in particular, for a left-handed operation and the other work position may serve for a right-handed operation of the fingerprint sensor 5.

The changeability of the handle 6 in terms of position may in this case, in particular, have a mirror-image quality or symmetry in relation to the fingerprint sensor 5, in particular in such a way that the two aforementioned work positions are symmetrical in relation to a plane of symmetry 24 passing through the fingerprint sensor 5. In particular, the handle 6 may have a first work position, in which an at least larger part of the handle 6 lies on the right-hand side of the fingerprint sensor 5 while, in a second work position, an at least larger part of the handle 6 lies on the left-hand side of the fingerprint sensor.

By way of example, the handle 6 may be mounted in a swivelable manner, as shown in FIG. 6, wherein the handle, in so doing, may have a swivel axis perpendicular to the longitudinal direction of the handle 6, said swivel axis being able to extend approximately centrally in relation to the fingerprint sensor 5, for example being able to be arranged centrally above the aforementioned fingerprint sensor 5.

However, as an alternative or in addition to such a swivelable mount about the swivel axis 21, the handle 6 may also be movable or changeable in terms of position in a different way, for example by reconnection between two or more work positions and/or by a displaceability of the handle 6, for example in the form of a displaceable mount of the handle 6 parallel to the longitudinal axis thereof. If FIG. 6 is considered, the handle 6 could also be brought from the right-handed work position, depicted with a full line, into the left-handed work position, depicted in a dashed manner, by a displacement in the longitudinal direction.

Here, in the work positions thereof, the handle 6 is in each case positioned relative to the fingerprint sensor 5 in such a way that the thumb of the right or left hand is positionable on the fingerprint sensor 5 in the aforementioned manner. In order to be able to provide the above-described acute-angled alignment or tilt of the fingerprint sensor 5 in a fitting manner for both work positions, the fingerprint sensor 5 may, in a suitable manner, be mounted in a rotatable or tiltable manner, as was already described in principle.

As FIGS. 6 and 7 likewise show, the handle 6 may be arranged not only directly on the device housing 2 of the main device 1 or of the gaming machine, but also on a device housing portion 4 of an operating device which is separate from the main device and has an interface 22 to allow it to be connected to the main device 1. This interface 22 may be a wired parallel or serial interface, for example in the form of a USB interface or an RS-232 interface, or else it may be an interface working on wireless principles, for example in the form of a WLAN interface or Bluetooth interface or IrDA interface operating on the basis of infrared signals, or a combination of these interfaces.

As FIGS. 8 to 10 show, the handle 6 may also have a multi-member embodiment, for example in order also to be able to assume a parked position or non-operational position, which is shown in FIG. 9, in addition to the two work positions.

In particular, the handle 6 may comprise a grip element 6a, which forms the actual handle on which the balls of the hand are supported and which may be grasped by the fingers of a hand, wherein said grip element may e.g. have an elongate or rod-shaped embodiment. The aforementioned grip element 6 may be supported on a support member 6b, which support member 6b may be movably mounted on the device housing portion 4. By way of example, the aforementioned support member 6b of the handle 6 may be mounted in a swivelable manner about a swivel axis 23 which extends perpendicular to the longitudinal direction of the support member 6b. In turn, the grip element 6a of the handle 6 may be hinged onto the aforementioned support member 6b in a swivelable manner, wherein the swivel axis 21 of the grip element 6a may, once again, extend perpendicular to the longitudinal direction of the aforementioned grip element.

As it were, the aforementioned support member 6b forms a guide for the hinged connection of the grip element 6a on the device housing portion 4, which may be part of the device housing of the main device or of a separate operating device.

Advantageously, the movability of the handle 6 may be embodied in such a way that the handle 6 is able to be brought into a parked position, in which the handle 6, preferably including the grip element 6a and the support member 6b thereof, nestles against the device housing portion 4 or extends adjacent to said housing portion along the latter and, as it were, is cleared up in a space-saving manner.

In order to bring the handle 6 into the work position thereof, the support member 6b is raised or positioned projecting (e.g. perpendicularly) from the device housing portion 4 and affixed where necessary, for example by a detachable plug-in interlocking connection or a screw-in clamping connection or a self-locking latching connection. The grip element 6a can be angled in relation to the support member 6b, wherein the two different work positions may also be set, i.e. a first work position in which an at least larger part of the grip element 6a lies on the right-hand side of the fingerprint sensor 5 while an at least larger part of the grip element 6a lies on the left-hand side of the fingerprint sensor 5 in a second work position.

The fingerprint sensor 5 may advantageously be arranged on the aforementioned support member 6b, and hence on the handle 6, wherein the arrangement may once again be made in such a way that, when the grip element 6a is grasped by the index finger, middle finger, ring finger and/or little finger of a hand, the thumb of this hand is able to be placed onto the fingerprint sensor 5 next to the handle element 6a.

As shown in FIGS. 8 and 10, the grip element 6a of the handle 6 can be brought into two different work positions relative to the support member 6b and hence relative to the fingerprint sensor 5 in order, selectively, to be able to grip the handle 6 and operate the fingerprint sensor 5 with either the left hand or the right hand. Instead of the swivelability shown in FIGS. 8 to 10, a changeability of the position may also be provided in a different manner in the case of a multi-member embodiment of the handle 6, for example by reconnection or displacement. By way of example, the grip element 6a can be plugged onto the support member 6b in different positions and the support member 6b can be securely plugged in different positions from the device housing portion 4.

The invention claimed is:

1. A device comprising a fingerprint sensor, wherein the fingerprint sensor is arranged spaced apart from a handle of the device in a vicinity of the handle in such a way that, when the handle is grasped by index finger and/or middle finger and/or ring finger and/or little finger of a hand, a thumb of this hand is able to be placed next to the handle on the fingerprint sensor such that a thumb tip longitudinal axis of the thumb substantially coincides with a principal axis of the fingerprint sensor, and wherein the handle is moveable relative to the fingerprint sensor between a first work position for a right-handed operation of the fingerprint sensor and a second work position for a left-handed operation of the fingerprint sensor, and the fingerprint sensor is mounted in a rotatable or tiltable manner allowing to provide an acute-angled alignment or tilt of the fingerprint sensor in respect of the handle for both the first work position and the second work position.

2. The device as claimed in claim 1, wherein the fingerprint sensor is arranged offset from the handle across a handle longitudinal axis and/or at a distance from the handle and/or a grip portion of the handle in a direction of the handle longitudinal axis.

3. The device as claimed in claim 1, wherein the fingerprint sensor is moveable relative to the handle in a translationally displaceable manner.

4. The device as claimed in claim 1, wherein the fingerprint sensor is tiltable about a tilt axis which extends approximately perpendicular to a bearing surface of the fingerprint sensor and/or approximately perpendicular to a housing side adjoining the fingerprint sensor and/or about an upright tilt axis and/or about a horizontal tilt axis, which extends approximately parallel to the bearing surface of the fingerprint sensor.

5. The device as claimed in claim 1, wherein, with the principal axis of the fingerprint sensor, the fingerprint sensor is able to be brought into an acutely inclined alignment relative to a handle longitudinal axis.

6. The device as claimed in claim 5, wherein the fingerprint sensor, with the principal axis thereof, is able to be brought into an acutely tilted alignment about two axes in relation to the handle and/or into a skew alignment in relation to the handle.

7. The device as claimed in claim 1, wherein the handle has a horizontal alignment and the fingerprint sensor is arranged below the handle.

8. The device as claimed in claim 1, wherein the fingerprint sensor has a bearing surface with an upright alignment.

9. The device as claimed in claim 1, wherein a bearing surface of the fingerprint sensor lies in a plane or nestles to a plane which is at an acute angle relative to a handle longitudinal axis.

10. The device as claimed in claim 1, wherein the handle is mounted in a manner movable to and from between the two work positions, the two work positions being arranged symmetrically in respect of a symmetry plane and/or axis of symmetry passing through the fingerprint sensor.

11. The device as claimed in claim 1, wherein the handle is movably mounted between the two work positions and a parked and/or non-operational position.

12. The device as claimed in claim 1, wherein the handle is swivelably mounted about at least one swivel axis, said swivel axis extending perpendicular to a longitudinal direction of the handle at an end portion of the handle.

13. The device as claimed in claim 1, wherein the handle has a multi-member embodiment and comprises handle parts, positions of the handle parts in relation to one another are able to be changed, with the fingerprint sensor being attached to one of the handle parts.

14. The device as claimed in claim 13, wherein the handle has a handle element which has a multi-axis-swivelable embodiment which is swivelable about a swivel axis relative to at least one support member of the handle, said support member itself being mounted in a manner swivelable about a swivel axis relative to a device housing portion.

15. The device as claimed in claim 1, wherein the device is embodied as an operating device separated from a main device, said operating device having an interface for connection with the main device.

* * * * *